(12) United States Patent
Derrien

(10) Patent No.: US 10,493,686 B2
(45) Date of Patent: Dec. 3, 2019

(54) OVEN FOR THE THERMAL CONDITIONING OF PREFORMS AND CONTROL METHOD OF AN AIR COOLING DEVICE FITTED TO SUCH AN OVEN

(71) Applicant: SIDEL PARTICIPATIONS, Octeville sur Mer (FR)

(72) Inventor: Mikael Derrien, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 6 days.

(21) Appl. No.: 14/976,942

(22) Filed: Dec. 21, 2015

(65) Prior Publication Data

US 2016/0167283 A1 Jun. 16, 2016

Related U.S. Application Data

(63) Continuation of application No. 13/150,736, filed on Jun. 1, 2011, now abandoned.

(30) Foreign Application Priority Data

Jun. 2, 2010 (FR) ..................................... 10 54309

(51) Int. Cl.
*B29C 49/64* (2006.01)
*B29C 49/68* (2006.01)
(Continued)

(52) U.S. Cl.
CPC ............ *B29C 49/68* (2013.01); *B29B 13/024* (2013.01); *B29C 35/0805* (2013.01); *B29C 35/16* (2013.01); *B29C 49/6445* (2013.01); *F27D 15/02* (2013.01); *F27D 15/0206* (2013.01); *B29C 49/04* (2013.01); *B29C 2035/0822* (2013.01); *B29C 2035/1658* (2013.01); *B29K 2067/003* (2013.01); *B29K 2105/258* (2013.01)

(58) Field of Classification Search
CPC ............ B29C 49/68; B29C 2035/1658; B29C 2035/0822; B29C 2049/4828; B29C 2049/483; B29C 2049/4835; B29B 13/024
USPC ............................ 432/77–85, 48, 4; 425/526
See application file for complete search history.

(56) References Cited

U.S. PATENT DOCUMENTS 4,834,646 A * 5/1989 Terashima ................ F27B 9/12
432/144
5,322,651 A 6/1994 Emmer
(Continued)

FOREIGN PATENT DOCUMENTS

DE 3101282 A1 8/1982
EP 0565874 A1 10/1993
(Continued)

OTHER PUBLICATIONS

French Search Report, dated Feb. 23, 2011, from corresponding French application.

*Primary Examiner* — Steven B McAllister
*Assistant Examiner* — Ko-Wei Lin
(74) *Attorney, Agent, or Firm* — Young & Thomson

(57) ABSTRACT

An oven (10) for the heat treatment of preforms and a method for operating an air-cooling device (42) fitted to such an oven includes controlling elements (58) to vary the cooling air flow rate onto the body (18) and bottom (20) of the preforms (12) along the heating path.

14 Claims, 3 Drawing Sheets

(51) Int. Cl.
  *B29B 13/02* (2006.01)
  *B29C 35/08* (2006.01)
  *B29C 35/16* (2006.01)
  *F27D 15/02* (2006.01)
  *B29C 49/04* (2006.01)
  *B29K 67/00* (2006.01)
  *B29K 105/00* (2006.01)

(56) References Cited

U.S. PATENT DOCUMENTS

| | | | |
|---|---|---|---|
| 5,326,258 | A | 7/1994 | Gittner et al. |
| 5,425,502 | A * | 6/1995 | Weng et al. ............... 236/13 |
| 5,681,521 | A | 10/1997 | Emmer et al. |
| 5,920,677 | A | 7/1999 | Emmer et al. |
| 6,632,087 | B1 | 10/2003 | Armellin et al. |
| 6,839,652 | B2 | 1/2005 | Shelby et al. |
| 7,284,778 | B1 | 10/2007 | Pellegatta |
| 7,491,358 | B2 | 2/2009 | Gernhuber et al. |
| 2005/0008983 | A1* | 1/2005 | Wang ............... H01L 21/67109 432/81 |
| 2006/0011604 | A1 | 1/2006 | Evrard et al. |
| 2007/0148272 | A1* | 6/2007 | Doudement ............... 425/174.4 |
| 2008/0073333 | A1* | 3/2008 | Doudement ............... 219/385 |
| 2009/0050130 | A1 | 2/2009 | Kim et al. |
| 2009/0317506 | A1* | 12/2009 | Adriansens ............... A61L 2/04 425/103 |
| 2010/0045228 | A1* | 2/2010 | Rollins ............... F04D 19/00 318/503 |
| 2010/0083682 | A1* | 4/2010 | Koehler ............... F24F 11/0001 62/262 |
| 2010/0112925 | A1* | 5/2010 | Schmitt et al. ............... 454/184 |
| 2011/0083454 | A1* | 4/2011 | Kopko ............... F25B 49/027 62/115 |

FOREIGN PATENT DOCUMENTS

| | | | |
|---|---|---|---|
| EP | 1383636 | B1 | 1/2004 |
| FR | 2 732 924 | A1 | 10/1996 |
| FR | 2 872 734 | A1 | 1/2006 |
| FR | 2 934 196 | A1 | 1/2010 |
| JP | S6034827 | A | 2/1985 |
| JP | H0615645 | A | 1/1994 |
| JP | H06198726 | A | 7/1994 |
| JP | 2000313920 | A * | 11/2000 ............... C21D 9/52 |
| JP | 2007514571 | A | 6/2007 |
| JP | 2007521986 | A | 8/2007 |
| JP | 2010507503 | A | 3/2010 |
| WO | 94/23932 | A1 | 10/1994 |
| WO | 9511791 | A2 | 5/1995 |
| WO | 00/48819 | A1 | 8/2000 |
| WO | 2004/062885 | A1 | 7/2004 |
| WO | 2005067591 | A2 | 7/2005 |
| WO | 2009109777 | A1 | 9/2009 |
| WO | 2010012646 | A1 | 2/2010 |

* cited by examiner

OVEN FOR THE THERMAL CONDITIONING OF PREFORMS AND CONTROL METHOD OF AN AIR COOLING DEVICE FITTED TO SUCH AN OVEN

The present invention relates to an oven for the heat treatment of preforms and to a method for operating an air-cooling device fitted to such an oven.

The present invention relates more specifically to an oven for the heat treatment of thermoplastic preforms each respectively comprising a first part in its definitive shape and a second part intended to be heated by heating means arranged along at least part of a determined heating path followed by the preforms travelling through the oven, the said oven comprising a cooling system capable of cooling the first parts and the second parts of the preforms.

In general, the invention relates to the field of the manufacture of containers which are obtained by the conversion of preforms, particularly by blow-moulding or by stretch-blow-moulding, the preforms notably being obtained by the injection-moulding of thermoplastic, for example of polyethylene terephthalate (PET).

To do this, the preforms undergo a preliminary heat treatment in an oven to raise them to a temperature above the glass transition temperature of the material of which they are made.

The manufacture of containers such as bottles, vials or any other type of hollow body is generally performed in installations comprising such a preform heat treatment oven associated with at least one machine for the conversion of preforms into containers which machine is located downstream, for example a "blower".

Many preform heat treatment ovens, notably those incorporated into installations for the manufacture of containers, are known from the prior art.

Document WO-A-2004/062885, to which reference may be made for fuller details, non-limitingly illustrates one example of a heat treatment oven, more particularly an oven of the linear type (as opposed notably to an oven of the circular type).

It will be recalled that a thermoplastic preform or parison respectively comprises a first part in its definitive shape, which consists of the neck and the flange, and a second part which is the only part intended to be heat treated in the oven and which consists of the body and the bottom.

The heat treatment of the second parts formed of the body and of the bottom of the preforms is an operation that is particularly tricky because of the importance that the temperature of the material has in relation to the subsequent conversion operations, for example conversion by blowing a gas (air) under pressure or stretch-blow-moulding, or alternatively conversion which is effected at least in part by filling with a pressurized liquid.

On the one hand, the mean temperature of the second part of the preforms needs to be higher than the glass transition temperature of the material (around 80° C. for PET) so as to allow biorientation of the material during the conversion, but at the same time needs to be lower than the crystallization temperature (around 140° C. for PET) above which there is a risk that the material will crystallize, making the preform unsuited to any further conversion.

Thus, too low a preform temperature may cause a whitish pearlesence (pearlized appearance) of the end container as a result of an overstretching of the preform which at molecular level leads to breaks in the long polymerized chains.

By contrast, too high a preform temperature may cause spherolitic crystallization of the constituent material, thus rendering the preform unsuited to any further conversion, notably involving blow moulding and/or filling.

What is more, the temperature distribution within the preform itself has an impact on the quality of the end container, and in particular on the transparency and distribution of material in the body and bottom of the container.

The temperature distribution through the body and bottom of the preform is multi-faceted, including the distribution around the circumference of the preform (that is to say the angular distribution about the main axis of the preform), the axial distribution (that is to say that parallel to the said axis) and also the distribution through the wall thickness of the body and of the bottom of the preform.

Thus, in order to ensure a temperature distribution around the entire circumference of the preform, the preforms are generally rotated on themselves about their main axis at the same time as they travel past the heating means arranged on all or part of the heating path.

The rotating of the preforms in order to obtain a uniform circumferential temperature distribution is, however, dependent on the application, because for certain applications a non-uniform circumferential distribution is likewise sometimes sought, particularly on containers of complex shape.

For fuller details, reference may, for example, be made to document WO-A-94/23932 regarding the heat treatment of a preform in order to obtain an end container with a complex shaped body.

The preforms are rotated using gripper means that hold the preforms in position, neck up or neck down, along the entire heating path, the gripper means being connected for the purposes of movement to the transport device that performs said looped heating path.

Document WO-A-00/48819, to which reference may be made for fuller details, illustrates one example of a transport device and improved gripper means.

It is also possible to control the axial distribution of the temperature, i.e. the heating profile parallel to the axis of the perform, and to do so by controlling, for example, the power radiated by the lamps (infrared radiation lamps) or diodes used as heating means in such an oven, by using focusing means (FR-A-2.732.924) or alternatively by selectively setting the position of each lamp so as to vary the distance between each of the lamps and the corresponding portion of the second part of the preforms (FR-A-2.872.734).

The temperature distribution through the thickness of the wall of the body and of the bottom of the preform is, on the other hand, far more difficult to master even though it is this distribution that is of key importance in mastering the subsequent operation of converting the preform into a container.

The ideal outcome of the preform heat treatment is a temperature gradient through the wall which is such that the temperature of the internal surface of the wall is greater than, or failing that at least equal to, the temperature of the external surface of the wall.

This is because it has been found that a small gradient between the temperature of the external surface of the wall and the temperature of the internal surface of the wall, which is comparatively higher than that of the external surface, makes it possible to obtain an end container with good visual and structural qualities, notably good transparency and a relatively consistent wall thickness.

The reason for this is notably that, when the preform is being converted into a container, the radial development of the inside diameter of the preform is then greater than the radial development of the outside diameter and it is therefore preferable for the wall to have such a temperature gradient which favours the wall surface that is effecting the greatest radial development.

What is more, it will be understood that obtaining such a gradient is, in practice, all the more important when the wall is very thick or when the container is obtained after a great deal of radial development of the preform.

In a heat treatment oven, it is common practice to use an air-cooling system to perform a dual cooling function.

The cooling system on the one hand cools the second parts of the preforms and on the other hand cools the first parts of the preforms and the constituent mechanical components of the oven to prevent them from deteriorating.

Such a system for the air-cooling of preforms contributes, in combination with the heating parameters, towards obtaining the desired gradient in the wall of the preform by encouraging the transmission of heat by convection through the thickness of the material of the body and of the bottom and by limiting the surface heating induced by the absorption of the emitted radiation.

In fact, the applicant has been able to establish that mastering the temperature distribution in the body and the bottom and obtaining a gradient of the abovementioned type in the wall of this second part of the preform can more especially be achieved by setting the following various parameters:

the radiation exposure time;
the speed at which the preforms rotate on themselves;
the preform thermal stabilization time;
the ventilation cooling of the body and of the bottom.

These settings are generally made on the basis of temperature measurements taken on the preforms as they leave each heat treatment oven.

Thus, the optimization of the heat treatment method in order to obtain the desired temperature distribution in the second parts of the preforms in the oven is very particularly dependent on the setting of these parameters.

In order to optimize the heat treatment of the preforms, improvements have been made to the ovens but these improvements essentially concentrate on the heating means arranged along at least part of the heating path in order to form a heating tunnel.

In terms of the cooling system by contrast, the improvements made relate mainly to the quality of the air used in the oven for cooling purposes, its cleanliness (dust, bacteria, etc.), its temperature or its level of humidity.

In terms of the cooling system, the setpoint for the ventilation means of the cooling system is therefore set in order to obtain a cooling air flow rate capable of avoiding any crystallization and also of safeguarding the mechanical components of the oven.

Thus, and because of its dual function, the ventilation is not a parameter that a person skilled in the art considers when determining the settings for the preform heat treatment oven.

This is because the power of the ventilation means of the cooling system is set initially to deliver a given flow rate of cooling air capable of avoiding crystallization of the preform and of safeguarding the mechanical components of the oven.

As a result, the cooling air flow rate is always constant along the entire heating path followed by the preforms.

The cooling air is therefore delivered to the second parts of the preforms always at the same flow rate, irrespective of the position of the preform on the entirety of the heating path, where it enters to where it exits the oven, the preforms receiving the same amount of cooling air throughout the heating path.

It is an object of the present invention notably to improve the method for heat treating preforms in an oven by optimizing the cooling so as to improve the quality of manufacture of the containers.

To this end, the invention proposes an oven for the heat treatment of preforms, of the type described hereinabove, characterized in that the cooling system comprises at least one cooling device capable of air-cooling at least the second part of the preforms, the said cooling device comprising at least ventilation means capable of delivering a given flow rate of cooling air and means for selectively varying, along the heating path of the preforms, at least the cooling air flow rate delivered by the said ventilation means for cooling the said second parts of the preforms.

The invention therefore proposes that the cooling air flow rate be varied along the heating path, preferably only the cooling air for the second parts of the preforms, the air flow rate being determined as a function of the position occupied by the preform along the said path.

Advantageously, the cooling air is delivered to the second part of a preform travelling along a given portion of the heating path at a given air flow rate that is at least different from the flow rate at which the cooling air is delivered to the said second part of this same preform travelling along another portion of the said path.

The principle underlying the invention, which involves varying at least the cooling air flow rate delivered to the second parts of the preforms that are to be heat treated, is counter to the preconceptions of a person skilled in the art.

First of all, because the air ventilation cooling system also has the function of safeguarding the mechanical components rather than only having the function of preventing crystallization.

Specifically, in the heat treatment ovens of the prior art, the cooling system performs the dual function of cooling, on the one hand, the body (and bottom) and, on the other hand, the neck and the mechanical components such as the gripper means.

Thus, hitherto, the whole of the ventilation means of the cooling system was initially set at a determined power setpoint so as to deliver a preform cooling air flow rate that was constant over the entirety of the heating path.

In the prior art, the ventilation means deliver a cooling air flow rate to the preforms which is the same at every point on the heating path so that each second part of a preform receives cooling air perfectly uniformly along the entire heating path.

According to the invention, the cooling air flow rate delivered to the second parts of the preforms advantageously varies along the heating path in order to optimize the heat treatment and, more particularly, in order to obtain a gradient in the wall which gradient is such that the internal temperature is higher than the external temperature, within the shortest possible heat treatment time.

By virtue of the invention, the efficiency of the heat treatment oven is improved, for example because the preforms, which generally enter the oven cold, are no longer cooled or are cooled with a low cooling air flow rate over the first portion of the heating path that immediately succeeds the entry to the oven.

This is possible because the risk of crystallization of the preform is then practically zero which means that the cooling air hitherto delivered over such a first portion contributes only to reducing the efficiency of the heating means and subsequently increasing the total time needed for the preform to achieve the desired heat treatment.

The invention therefore makes it possible, aside from increasing the efficiency of the ovens, also to reduce the energy consumption of the ovens, especially the consumption of electricity used by the heating means.

This is because setting a low or zero cooling air flow rate over the first portion of the path will incidentally make it possible to reduce the power setting of the heating means so that the electricity consumption will thereby be reduced, without the start of the heating of the preforms thereby being affected.

Advantageously, the energy consumption of the ventilation means is also reduced once the air flow rate has been optimized for each portion of the heating path, whether or not the heating means therein are active, as in the stabilization portions for example.

Advantageously, the cooling system comprises at least a first cooling device intended to cool the first part of the preforms that are at their definitive shape and a second cooling device, independent of the first cooling device, and intended to air-cool the second part of the preforms.

Thanks to such a cooling system, the cooling functions can be completely separated as compared with the solutions known from the prior art, by cooling the second parts of the preforms independently of the first parts of the preforms and of the gripper means associated with the transport device.

Advantageously, the cooling air flow rate needed to establish the desired gradient can be constantly optimized throughout the heating path, while at the same time avoiding the risks of crystallization of the second parts of the preforms.

According to other features of the invention:
- the said means for selectively varying the cooling air flow rate on at least the second part of the preforms along the heating path consist of at least one speed variator associated with at least one of the ventilation means of the said at least one cooling device so that the variation in cooling air flow rate along the path is obtained by selectively operating the said speed variator associated with the said ventilation means independently of the other ventilation means of the cooling device;
- the speed variator is operated via at least one operating unit to act on a drive motor that drives the said associated ventilation means so as selectively, along the heating path, to vary the air flow rate delivered for cooling at least the second parts of the preforms;
- the means for selectively varying the cooling air flow rate on at least the second part of the preforms along the heating path at least consist of shut-off means so that the variation in cooling air flow rate along the path is obtained by selectively operating each of the shut-off means independently of the other shut-off means of the cooling device;
- the shut-off means can be operated selectively in terms of their position so as selectively, along the heating path, to vary the air flow rate delivered for cooling at least the second parts of the preforms;
- the shut-off means, such as least one pivoting flap, are arranged in at least one duct of the cooling device which duct is intended to carry the cooling air to the second parts of the preforms;
- the shut-off means, such as a sliding flap, are arranged upstream of the reflectors facing the heating means and are mounted such that they can move in terms of position in order selectively to open or close all or some of the cooling air passage openings formed in the region of the reflectors in order to deliver the cooling air to the second parts of the preforms;
- the oven comprises temperature measurement means capable of measuring the internal temperature and/or the external temperature of the wall of the second part of the preforms at least at a determined position along the heating path and of supplying at least one signal representative of one of the said measured temperatures or of the gradient corresponding to the difference between the said internal and external temperatures of the wall;
- the cooling system comprises at least one operating unit for operating the said at least one cooling device which is capable of controlling the said means intended selectively along the heating path to vary the air flow rate for cooling at least the second parts of the preforms so as to set the heat treatment of the preforms along the heating path through real-time control of the said means of the cooling device;
- the said operating unit controls the said means as a function of at least one data item such as the said at least one signal representative of the internal and/or external wall temperature or of the gradient corresponding to the difference between the said internal and external temperatures;
- the oven is of modular design comprising at least a number [n] of modules in which the said heating means are mounted arranged along all or part of the heating path, and the means for selectively varying the air flow rate for cooling at least the second parts of the preforms are common to at least two modules designed to form a series and/or parallel unit;

The invention also proposes a method for operating a cooling device which, being fitted to a heat treatment oven, is intended to air-cool at least the second parts of the preforms travelling through the oven along a heating path, characterized in that the operating method comprises at least one step consisting in operating the means in order selectively to vary the cooling air flow rate delivered at least to the said second parts of the preforms along the heating path.

Advantageously, the method comprises a step consisting in measuring the internal temperature and/or the external temperature of the wall of the second part of the preform so as to produce at least one signal representative of the internal and/or external temperature of the wall or of the gradient corresponding to the difference between the said internal and external temperatures.

Advantageously, the method comprises at least one setting step consisting in controlling the said means in real time in order, as a function of at least one data item such as at least one signal representative of temperature, to set the air flow rate for cooling at least the second parts of the preforms which flow rate is delivered variably along the heating path.

By virtue of the method for operating the air-cooling device according to the invention, the heat treatment of the preforms in the oven is optimized.

Other features and advantages of the invention will become apparent from reading the detailed description which follows, for an understanding of which reference will be made to the attached drawings in which.

Figure 1:
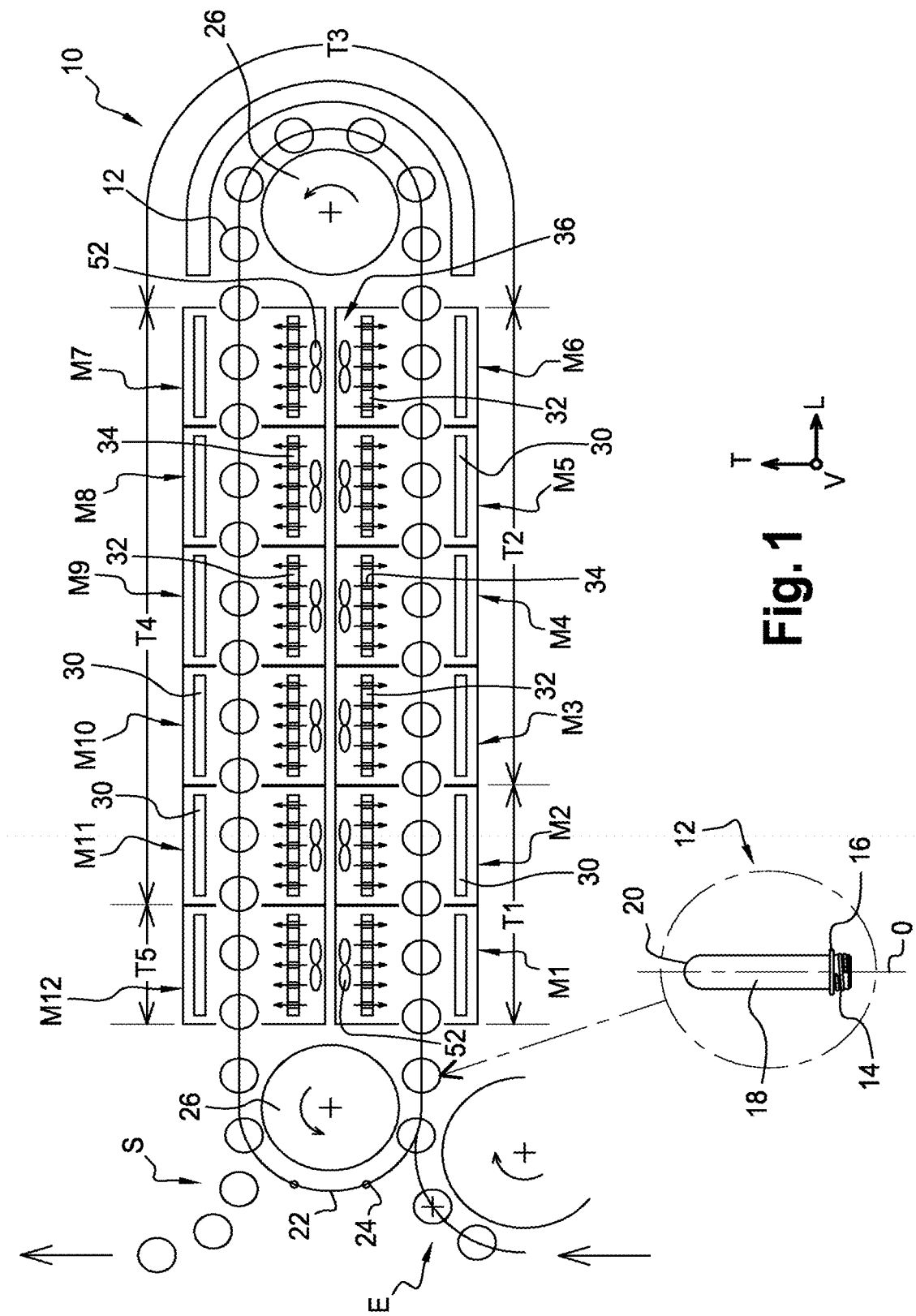
FIG. 1 is a plan view schematically depicting one embodiment of an oven for the heat treatment of preforms.

In the description and the claims use will be made, non-limitingly, of the "longitudinal", "vertical" and "transverse" orientations to denote respectively elements according to the definitions given in the description and with respect to the (L, V, T) trihedral frame of reference depicted in the figures.

By convention, the terms "upper" and "lower" will be used to qualify the elements in relation to the vertical orientation of the (L, V, T) trihedral frame of reference, this being with no reference to the Earth's gravitational field.

Likewise, the terms "upstream" and "downstream" will be used with reference to the direction in which the preforms circulate along the heating path or, alternatively, with reference to the direction in which the cooling air circulates through the oven.

The elements of the invention that are identical, similar or analogous will be denoted by the same reference numerals.

FIG. 1 depicts one embodiment of an oven 10 for the heat treatment of thermoplastic preforms 12.

Non-limitingly, the oven 10 is an oven of linear type having a preform 12 heating path that describes the shape of a "U" from an entry E of the oven to an exit S thereof.

As an alternative, the oven 10 is a circular oven, that is to say an oven that has a heating path in the shape of a roughly circular "C".

Advantageously, the oven 10 is an oven of modular design. What is meant by a modular oven 10 is an oven that comprises at least a determined number [n] of modules, one module for example being defined with respect to the heating means, which heating means are generally in the form of a subassembly or unit comprising for example infrared radiation lamps which are superposed radially one above the other.

In a known way, an oven 10 comprises more or fewer heating modules according to the heating time needed for the application, and this is what determines the length of the oven 10 or, more generally, its size.

Specifically, the heat treatment time can vary from one preform 12 to another, notably according to its wall thickness, its material, etc.

The thermoplastic preforms 12, for example preforms made of polyethylene terephthalate (PET), are intended to be converted into containers after they have been heat treated in the oven 10.

In the remainder of the present description, the term "preform" non-limitingly denotes either a parison or an intermediate container, and likewise the term "blow-moulding" also, for the purposes of simplification, covers a stretch-blow-moulding operation.

One example of a preform 12 of vertical axis O and which here is in the overall shape of a test tube has been depicted in detail in FIG. 1 using an enlargement.

For the purposes of heat treatment, an especial distinction is made between two parts of the preform 12, namely, respectively, a first part that is in its definitive shape, and that consists of a neck 14 and a flange 16, and a second part which consists of a body 18 and a bottom 20.

Specifically, the first part 14, 16 in its definitive shape does not need to be heated, only the second part 18, 20 being intended to be heat treated in the oven 10.

As illustrated by FIG. 1, the tubular body 18 of the preform 12 is closed at an upper end by the hemispherical bottom 20 and at its lower end comprises a neck 14 which is already in the definitive shape of the neck of the container, the annular flange 16 which extends radially outwards roughly delineating the said first and second parts.

As explained in the preamble, the heat treatment performed in the oven 10 is intended at preparing the preform 12 for conversion, by blow-moulding and/or by filling with a fluid, so as to shape each preform 12 into a container.

In the oven 10, each preform 12 is transported by a transport device 22 along a heating path in the direction of the arrows depicted in FIG. 1, i.e. from upstream to downstream from the entry E to the oven where the preform generally enters "cold" (at ambient temperature) to the exit S of the oven where each preform 12, the second part of which has been heated, is then ready to be converted into a container.

In a heat treatment oven 10 like the one depicted in FIG. 1, the heating path comprises in succession, a first heating zone, known as the entry zone, formed by the straight outbound portion of the path starting at the entry E, a zone known as the first stabilization zone, formed by the curved portion, a second heating zone, known as the distribution zone, formed by the straight return portion of the path ending at the exit S, and a second stabilization zone consisting of the path followed by the preforms between the exit S and the conversion unit such as a blowing machine.

The first, entry, heating zone is intended to preheat the second part 18, 20 of the preform 12, for example up to a temperature of the order of 50° C. to 80° C., and the second, distribution, heating zone is intended to effect the final heating, for example to a temperature of the order of 90° C. to 110° C.

The temperatures are given by way of non-limiting indication and are notably dependent on the material of which the preform 12 is made, which in this instance is PET.

The first stabilization zone interposed between the first and second heating zones is intended, by means of the resulting time delay, to allow the heat to become evenly distributed throughout the second part 18, 20 of the preform 12.

Figure 2:
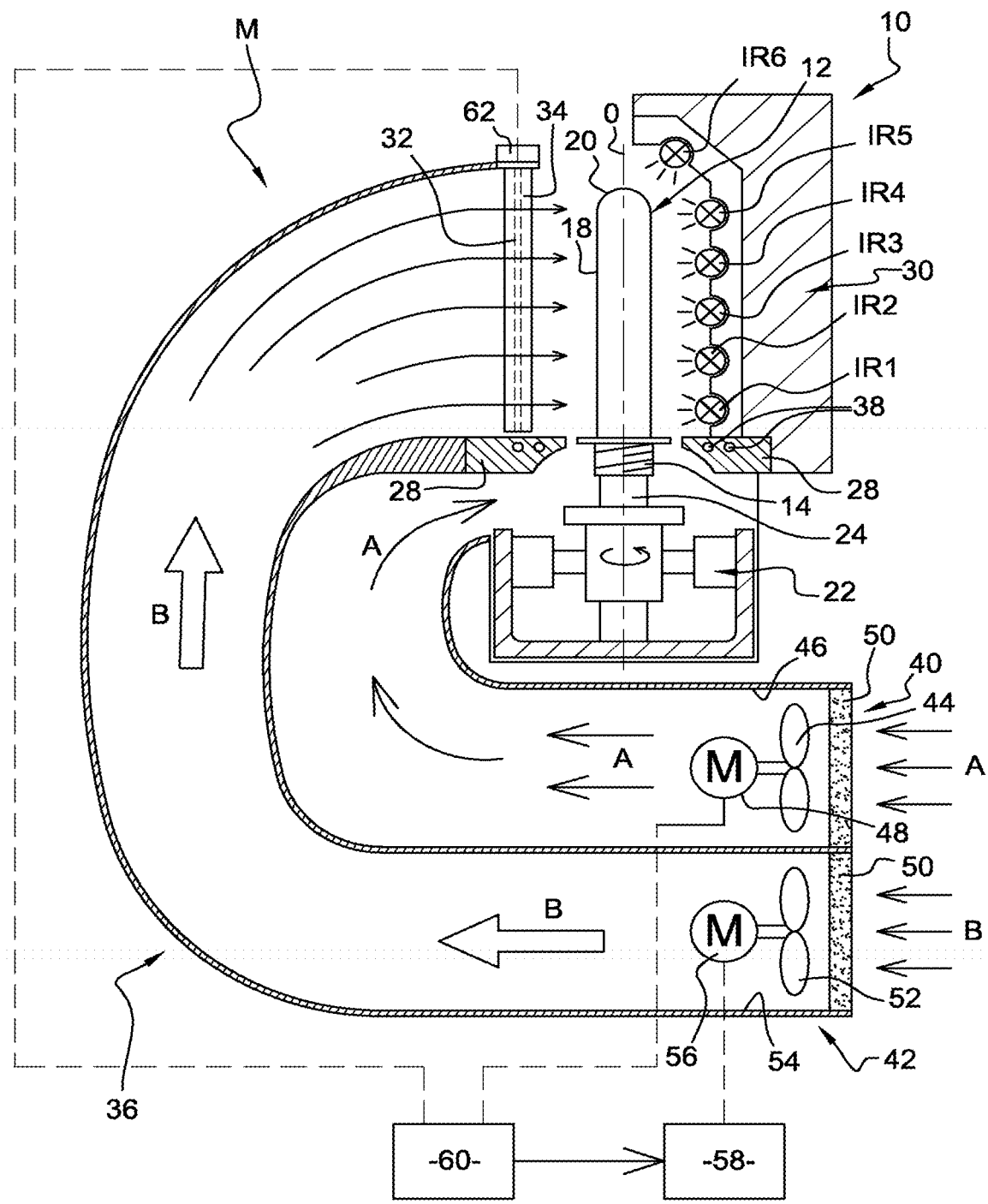
FIG. 2 is a cross section schematically depicting a module of the oven according to FIG. 1 and illustrating a first embodiment of means capable selectively along part of the heating path of varying the flow rate of the cooling air which is at least delivered to the said second parts of the preforms.

As may be seen in FIG. 2, the transport device 22 comprises gripper means 24 capable individually of collaborating with the neck 14 of each preform 12 in order to hold the preform 12 in a determined position, in this instance vertically neck down (or, as an alternative, neck up).

The gripper means 24 of the chuck type are connected in terms of movement to the transport device 22 and are advantageously able to rotate the preforms 12 on themselves about their main axis O.

The transport device 22 for example consists of a link chain or a belt which is driven in a closed loop between two wheels 26, at least one of which is turned by motorized means (not depicted).

The drive by the transport device 22 thus determines the speed V of travel through the oven of the preforms 12 supported by the gripper means 24, and also, incidentally, determines the total duration of the heat treatment or, more particularly, the duration of the time delay corresponding to the length of time taken by a preform 12 to pass through the first stabilization zone.

In order to avoid any deformation of the first part 14, 16 of the preform 12 during the heating in the oven, the neck 14 and the flange 16 of each preform 12 are protected by protection means 28 (FIGS. 2 and 3), such as manifolds, which extend longitudinally over at least part of the heating path, particularly over the first and second heating zones.

The oven 10 comprises heating means 30 which are preferably associated with reflectors 32.

The first and second heating zones respectively form a heating tunnel which is formed longitudinally on one side by a heating wall comprising the heating means 30 and on the other side by a reflective wall formed of the reflectors 32 which are arranged transversely facing the said heating means 30.

As can be seen in FIG. 1, the heating means 30 and the reflectors 32 are arranged along at least part of a heating path, here, along the first and second heating zones, the first stabilization zone having no heating means 30.

The heating means 30 are formed for example of diodes or infrared radiation lamps referenced IR1, IR2, IR3, . . . IRn in FIGS. 2 and 3, which are usually used in this field of application for heating the preforms 12.

For preference, the reflectors 32 are perforated with openings 34 to allow the passage of the cooling air that cools the second parts 18, 20 of the preforms 12, which air is delivered by a cooling system 36.

According to a first feature of the invention, the cooling system 36 comprises at least one cooling device capable of air-cooling at least the second part 18, 20 of the preforms 12.

Advantageously, the cooling system 36 is, however, capable respectively of cooling the first parts and the second parts of the preforms 12.

Specifically, the necks 14 of the preforms 12 are outside the tunnel comprising the heating means 30 and, although they are protected from radiation and heat by the means 28, the necks 14 do need to be kept below a certain temperature, by cooling.

To do this, the cooling of the first part 14, 16 of the preforms 12 is also performed by the air cooling system 36 with which the oven 10 is equipped, alone or in combination with additional cooling means.

Advantageously, the cooling system 36 comprises cooling means 38, for example the circulation of a heat transfer fluid (water) through pipes incorporated into the protective manifolds that make up the means 28.

The first parts 14, 16 of the preforms 12 are preferably cooled by at least one cooling device of the cooling system 36 and by such heat transfer fluid cooling means 38.

Advantageously, the cooling system 36 comprises at least a first cooling device 40 intended to cool the first part 14, 16 of the preforms 12 which are in their definitive shape, and a second cooling device 42 intended to air-cool the second part 18, 20 of the preforms 12.

As may be seen from FIG. 2, the second cooling device 42 of the cooling system 36 is advantageously independent of the first cooling device 40 so that the cooling of each of the first and second parts of the preforms 12 can be disconnected.

As an alternative, the cooling system 36 comprises a single air-cooling device intended to cool the first and second parts of the preforms 12 respectively.

For preference, the cooling system 36 comprises, for cooling the first parts 14, 16 of the preforms 12, a first cooling device 40 (independent of a second device 42) and cooling means 38.

The first air-cooling device 40 comprises ventilation means 44 which are arranged in a duct 46, known as the first duct, and which are rotationally driven by a motor 48.

For preference, the ventilation means 44 are arranged at the entrance to the first duct 46 and are able to draw in a stream A of ambient air through filtration means 50.

The first duct 46 carries the cooling air stream A as far as the first parts 14, 16 of the preforms 12 circulating through the oven 10 and the gripper means 24.

The second cooling device 42, which is independent of the first cooling device 40, comprises ventilation means 52 which are arranged in a second duct 54 and rotationally driven by a motor 56.

For preference, the second ventilation means 52 are arranged at the entrance to the second duct 54 and are able to draw in an ambient air stream B through filtration means 50.

The second duct 54 carries the cooling air stream B as far as the second parts 18, 20 of the preforms 12 circulating through the oven 10, in order to cool them.

The ventilation means 44, 52 here are arranged upstream of the preforms 12 so that the cooling air is respectively blown onto the first and second parts of the preforms 12.

As an alternative, the ventilation means 44 and/or 52 are arranged downstream of the preforms 12 so as to cause cooling air to circulate through the tunnel by depression.

According to the invention, the cooling system 36 comprises at least one cooling device 42 capable of air-cooling at least the second part 18, 20 of the preforms 12, the said cooling device 42 comprising at least ventilation means 52 capable of delivering a given cooling air flow rate and means 58, 64 for selectively, along the heating path of the preforms 12, varying at least the cooling air flow rate delivered by the said ventilation means 52 for cooling the said second parts 18, 20 of the preforms 12.

Advantageously, the flow rate at which the cooling air is delivered to the second part 18, 20 of a preform 12 travelling along a given portion of the heating path is at least different from the flow rate with which the cooling air is delivered to the second part 18, 20 of this preform 12 travelling along another portion of the said path.

As a result and according to the invention, the flow rate of cooling air delivered to the second parts 18, 20 of the preforms 12 via the second cooling device 42 of the system 36 is not constant along the entire length of the heating path followed through the oven 10 from the entry E to the exit S.

Advantageously, the second cooling device 42 comprises ventilation means 52 which are distributed along the entire length of the heating path and which are capable of being operated individually so as selectively to vary the cooling air flow rate as a function of the position occupied by the preform along the heating path.

For preference, the oven 10 is of modular design and comprises at least a number [n] of modules M comprising at least the said heating means 30 arranged along all or part of the heating path, and the associated reflectors 32.

As illustrated in FIG. 1, the oven 10 thus comprises modules M1, M2, M3 . . . Mi to form the first and second heating zones in the heating path.

By convention, a unit of a first type (in series) is defined as comprising at least two modules M arranged in series one after the other in the direction of the heating path followed by the preforms 12 through the oven 10 so that the second parts 18, 20 of the preforms 12 are heated consecutively by the heating means 30 of each module M of the unit of the first, "series", type.

Advantageously, the means for selectively varying the cooling air flow rate over the second parts 18, 20 of the preforms 12 are common to at least two heating modules M forming a unit of the first type (a series unit).

Thus, the flow rate of cooling air delivered to the preforms 12 passing through the two modules M that make up the unit of the first type is therefore the same.

By convention also, a unit of a second type (a parallel unit) comprising at least two modules M arranged in parallel and through which the preforms 12 pass in opposite directions is defined for the modular oven 10.

Typically, that will be the case of two modules M which are transversely aligned and respectively belong to the first, entry, heating zone in the case of one of them, and to the second heating zone in the case of the other.

A first embodiment of the means for selectively varying the cooling air flow rate on at least the second part of the preforms along the heating path will now be described with reference to FIG. 2.

Advantageously, the means for selectively varying the cooling air flow rate consist of at least one speed variator 58 which is associated with at least one of the ventilation means 52 of the second cooling device 42.

In this first embodiment, the variation in cooling air flow rate along the heating path is obtained by selectively operating the said speed variator 58 associated with the said ventilation means 52, independently of the other ventilation means 52.

For preference, each of the ventilation means 52 is associated with a variator 58 so that it can be operated independently of the other ventilation means 52 for ventilating the heating path.

As may be seen from FIG. 1, a ventilation means 52/variator 58 assembly is advantageously fitted to each of the modules M of the oven 10.

The speed variator 58 acts on the drive motor 56 that drives the ventilation means 52 with which it is associated so that the said ventilation means 52 delivers cooling air at a flow rate which differs from the air flow rate delivered by the other ventilation means 52.

Because the maximum cooling air flow rate which corresponds to 100% is determined by the maximum power of the drive motor 56 driving the ventilation means 52, it is possible, by using the speed variator 58, selectively to operate the ventilation means 52 associated with it in order to achieve delivery of a cooling air flow rate ranging between 0 and 100%, for example an air flow rate equal to 30%, 50% or 80%, over a given portion of the heating path.

Through independent operation of each of the oven 10 ventilation means 52 that deliver the cooling air, it is possible selectively and precisely to vary the cooling air flow rate delivered by the ventilation means 52 to the second parts 18, 20 along the heating path.

By way of non-limiting example, the heating path through the oven 10 has been broken down into a succession of portions in order to illustrate the implementation of the invention according to the first embodiment.

As may be seen from FIG. 1, the heating path for example comprises a first portion T1 comprising the modules M1 and M2, then a second portion T2 comprising the modules M3 to M6.

The first and second portions T1 and T2 correspond to the said first, entry, heating zone in which the second parts 18, 20 of the preforms 12 are heated.

The heating path then continues in the form of a third portion T3 which here corresponds to the first stabilization zone and has no heating means 30.

Depending on the application, cooling air may or may not be applied to the second parts 18, 20 of the preforms 12 in this first stabilization zone.

For preference, the oven 10 here has no such ventilation means 52 in the first stabilization zone.

After the third portion T3, the heating path in this example comprises another, fourth, portion T4 and a fifth portion T5 which together correspond to the second, distribution, heating zone.

The fourth portion T4 contains the modules M7 to M10 while the fifth portion T5 comprises the last modules M11 and M12 before the exit S from the oven 10.

For preference, each module M of the oven 10 is individually equipped, in addition to the heating means 30, with ventilation means 52 driven by a motor 56 capable of being operated by a speed variator 58 in order, via a duct 54, to deliver cooling air to a portion of the heating path.

By way of non-limiting example of the variation in cooling air flow rate along the length of the heating path, the variator 58 associated with the motor 56 of the ventilation means 52 of the first module M1 is set to a setpoint corresponding to a power of between 0 and 30% of the maximum power, for example 10%, so that the associated duct 54 delivers a near-zero or low cooling air flow rate.

Advantageously, the same setpoint between 0 and 30% is applied for setting the variator 58 associated with the motor 56 of the ventilation means 52 of the second module M2.

In this case, the cooling air flow rate is then identical over the first portion T1 comprising the said modules M1 and M2.

The variator 58 associated with the motor 56 of the ventilation means of each of the modules M3 to M6 that the second portion T2 comprises is set to a different setpoint, for example a higher one, corresponding to a power of between 30 and 60% of maximum power, such as 40% of maximum power.

Likewise, the variator 58 associated with the motor 56 of each of the ventilation means 52 of the next modules M7 to M10 that the fourth portion T4 comprises is also set to a setpoint different from those of the first, entry, heating zone (T1+T2), for example a setpoint corresponding to a power of between 50% and 80% of maximum power, such as 70%.

Finally, the variator 58 associated with the motor 56 of each of the ventilation means 52 of the modules M11 and M12 that the fifth portion T5 comprises is set with a setpoint corresponding to a power of 80% or 100% of maximum power.

To sum up, for the above example, the cooling air flow rate will, by comparison with the maximum flow rate that determines the 100% reference obtained with maximum power of the motor 56 that drives each of the ventilation means 52, vary successively along the length of the heating path such that it is equal to:

10% in the first portion T1 (modules M1 and M2)
40% in the second portion T2 (modules M3 to M6)
0% in the third portion T3 which is the stabilizing portion
70% in the fourth portion T4 (modules M7 to M10)
90% in the fifth portion T5 (modules M11 and M12).

Advantageously, the cooling air flow rate delivered in the first modules, here M1 and M2 in the abovementioned example, is near-zero or low once the preforms 12 have entered the entry E of the oven 10 "cold", generally at an ambient temperature of the order of 20° C.

The risks of crystallization of the second parts 18, 20 of the preforms 12 are therefore considered to be equal to zero when the heating of the heat treatment begins.

Be that as it may, in ovens 10 according to the prior art, cooling air was blown by the cooling system 36 with a flow rate that is constant from the entry to the exit.

As a result, because of the absence of flow rate or low flow rate of cooling air on this first portion T1, referring to the aforementioned example, the heating power of the heating means 30 is advantageously reduced without the heat treatment being ultimately affected.

Advantageously, the electrical energy consumption in these modules such as M1 and M2 is thus reduced, and in so doing, the efficiency of the oven 10 is improved.

Advantageously, the set of means such as the ventilation means 52, the motors 56 and the variators 58 can therefore be omitted from the first modules such as M1 and M2 in the heating path, to the notable benefit of a reduction in cost, particularly of hardware and upkeep thereof.

When the ventilation for the air cooling of the second parts 18, 20 of the preforms 12 is omitted, for example but non-limitingly on the first modules M or a determined first portion T1, the reflectors 32 are then advantageously replaced.

This is because there is then no need—in the absence of ventilation for air cooling—to have a "blowing" reflector 32, that is generally one which is perforated with numerous openings 34 to allow the passage of the cooling air.

Advantageously, use is made of reflectors which notably have a solid surface which are able to increase the reflection of radiation and, through their greater effectiveness, increase the overall efficiency of the oven 10.

Advantageously, the materials used for such reflectors are determined in order to optimize the reflection, notably of the infrared radiation, of the heating means 30, and to do so while also setting aside any compromise in also performing the ventilation function.

For preference these reflectors are made of materials such as fibrosil or alternatively of ceramic, rather than of aluminium which is the material used for the conventional reflectors 32 of the "blowing" type.

In addition, it will be noted that in the absence of cooling, reflectors 32 made for example of aluminium, are likely not to be able thermally to withstand the high temperatures encountered in such an oven 10.

Advantageously, reflectors made of the abovementioned materials (fibrosil, ceramic, etc.) have excellent thermal withstand, even with little or no cooling.

Of course, the use of such reflectors is not in any way restricted to cases in which the cooling ventilation is omitted, and such reflectors can even be used with any cooling system 36.

By comparison, although because of their solid surfaces they are less ventilating than the "blowing" reflectors 32 that have openings 34 in them, such reflectors can be arranged leaving passages for the cooling air between two consecutive reflectors.

For preference, special means are then implemented to improve the diffusion of cooling air from such a passage opening between two reflectors.

As an alternative, it is also possible to reduce costs—not by omitting means such as a ventilation means 52, a motor 56 and a variator 58—but by making such means common to at least two consecutive modules forming a series unit, such as the modules M1 and M2, or alternatively a parallel unit such as the modules M5 and M8.

As an alternative, the means 52, 56, 58 are shared between a series unit and a parallel unit, i.e. between a group of at least four modules M which are adjacent to one another in pairs.

Thus, the means 52, 56, 58 of the second cooling device 42 are advantageously common to or shared by two or more modules in the following portions T2 to T5.

The resulting cost reduction achieved by such commonality of means will be more particularly sought after when the oven 10 is fitted with a first air-cooling device 40 independent of the second device 42 for cooling the first parts 14, 16 of the preforms 12.

However, when the first cooling device 40 consists of at least one air-cooling device, the means 44, 48 are advantageously common to series and/or parallel units once the cooling air flow rate delivered for cooling the first parts 14, 16 of the preforms 12 is constant along the entire length of the heating path.

As an alternative, the cooling air flow rate delivered by the first cooling device 40 for cooling the first parts 14, 16 of the preforms 12 also varies along the heating path, notably but not exclusively if the oven 10 cooling system 36 comprises just one single device for air-cooling the entire preform 12, the said first device 40 then consisting of the second device 42 and vice versa.

However, it will be understood that the options of selectively varying the cooling air flow rate for the second parts 18, 20 of the preforms 12 along the heating path will be all the greater than will be the means 52, 56, 58 of the second cooling device 42 with which the oven 10 is fitted.

Thus, by comparison with the abovementioned example, the number of portions T1 to T5 can vary for each application, just as it will be recalled that the number of modules M in an oven 10 can also vary according to the application.

In the example given previously, the cooling air flow rates vary increasingly as the preforms 12 progress along the heating path, although it is recalled that that is merely one non-limiting example given for explanatory purposes.

In addition, the fact that in at least one given module M or that in one determined portion of the heating path air-cooling of at least the said second parts of the preforms 12 is performed does not necessarily lead to a consequence that the heating means 30 are active therein given that the stabilization portions can advantageously be arranged all along the heating path, to alternate with the heating portions, and therefore not only in the third portion T3 corresponding to the bend in the oven 10 depicted in FIG. 1.

Advantageously, each speed variator 58 is operated via at least one operating unit 60 to act on a drive motor 56 that drives the said associated ventilation means 52 so as to obtain the selective variation in air flow rate for cooling the second parts of the preforms 12 along the heating path.

According to the method for operating the second cooling device, the various setpoint values corresponding to the desired cooling air flow rates along the heating path are input into the operating unit 60.

For preference, the operating unit 60 is also capable of operating the ventilation means 44 of the first cooling device 40, which means are driven by the motor 48.

Advantageously, the first cooling device 40 comprises a variator (not depicted) which is associated with the drive motor 48 that drives the ventilation means 44, the said variator therefore being operated by the operating unit 60 or, as an alternative, by a separate operating unit.

Indeed according to the invention, the method for operating the cooling device 42 with which the heat treatment oven 10 is fitted, is intended to allow the second parts 18, 20 of the preforms 12 circulating through the oven 10 along the heating path to be air-cooled selectively.

Advantageously, the operating method comprises at least one step consisting in selectively operating the means 58 associated with the ventilation means 52 of the said device in order to vary the cooling air flow rate delivered to the said second parts of the preforms 12 along at least part of the heating path.

Advantageously, the method for operating the cooling device is further improved and is not restricted to operating the cooling device 42 as a function only of the setpoints initially entered into the operating unit 60 for varying the flow rate along the heating path.

Advantageously, the oven 10 comprises temperature measurement means 62 capable of measuring the internal temperature and/or the external temperature of the wall of the second part 18, 20 of the preforms 12 at least at a determined position along the heating path and of supplying at least one signal representative of one of the said measured temperatures or of the gradient corresponding to the difference between the said internal and external wall temperatures.

The operating method is therefore capable of closed-loop feedback control over the cooling air flow rate, using notably the internal and/or external temperature of the wall of the second part of the preforms 12.

For preference, the signals corresponding to the internal and external temperatures are transmitted to the said at least one operating unit 60 which then determines the gradient (or delta) corresponding to the difference between the said internal and/or external temperatures of the wall.

The temperature measurement means 62 consist for example of at least one pyrometer, or as an alternative, a thermal camera, which are used in particular for measuring the external temperature of the wall.

Advantageously, the temperature measurement means 62 used further comprise, especially for measuring the internal temperature, means of the type of those (probes) described in document WO-A1-2010/031923 to which reference can be made for fuller details.

Advantageously, the operating unit 60 is capable of controlling the said means consisting of the speed variators 58 in order selectively to vary the cooling air flow rate delivered to the second parts of the preforms along the heating path and do so as a function at least of the said signal representative of the internal and/or external temperature, so as to set the heat treatment of the preforms 12 along the heating path through real-time control over the said means and subsequently the ventilation means 52.

A second embodiment of the means for selectively varying the cooling air flow rate over at least the second part of the preforms 12 along the heating path will now be described with reference to FIG. 3.

The description of the second embodiment will advantageously be given by comparison with the first embodiment.

Advantageously, the means according to the invention for varying the cooling air flow rate consist at least of the shut-off means 64 which can be operated in terms of their position in order selectively, as a function of the portion of the heating path, to vary the cooling air flow rate delivered to the second parts 18, 20 of the preforms 12.

In the first embodiment, the variation in cooling air flow rate is obtained by acting, via the variator 58 coupled to the motor 56, directly on the ventilation means 52 which first create the cooling air stream.

In this second embodiment, each ventilation means 52 causes a given cooling air flow rate to circulate along the associated duct 54 of the second cooling device 42, which flow rate the said shut-off means 64 can selectively vary.

Thus, the shut-off means 64 are selectively operated in terms of their position in order to control the cooling air flow rate intended to be delivered to the second parts 18, 20 of the preforms 12.

Advantageously, the shut-off means 64 are arranged at least in the duct 54 of the second cooling device 42 intended to carry the cooling air as far as the second parts 18, 20 of the preforms 12.

Figure 3:
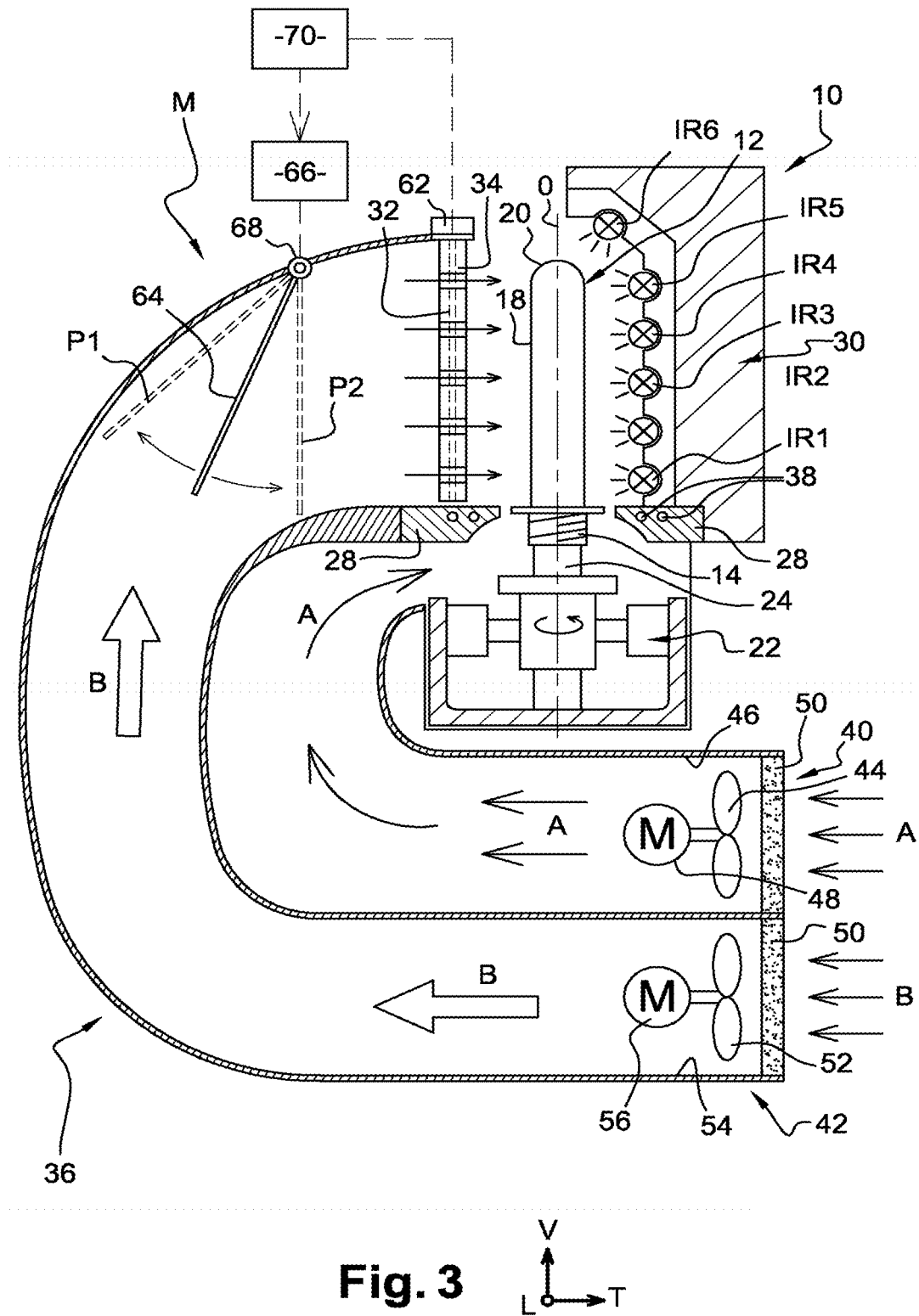
FIG. 3 is a cross section, similar to FIG. 2, schematically depicting a module of the oven according to FIG. 1 and illustrating a second embodiment of the means capable selectively along part of the heating path of varying the flow rate of the cooling air which is at least delivered to the said second parts of the preforms.

For preference and as illustrated in FIG. 3, the shut-off means 64 are produced in the form of at least one flap.

Advantageously, the shut-off means 64 are arranged upstream of the reflectors 32 facing the heating means 30 and are mounted such that they can move in terms of position in order selectively to open or close all or some of the cooling air passage openings 34 through which the cooling air is delivered to the second parts of the preforms 12.

As illustrated in FIG. 3, the shut-off means 64 for example consist of at least one flap arranged in the duct 54 associated with at least one module M of the oven 10, preferably as close as possible to the reflectors 32.

The flap 64 is mounted such that it can rotate between at least two extreme positions, a first position P1 in which the flap does not shut off the cross section of the duct 54 and a second position P2 in which the flap completely shuts off the duct 54, the said positions P1 and P2 being represented in dotted line in FIG. 3.

The first position P1 corresponds to the position in which all, that is to say 100%, of the cooling air flow rate generated by the ventilation means 52 is delivered, whereas the second position P2 corresponds to the position of the flap 64 that prevents any air from circulating along the duct 54 downstream of the flap 64 so that the cooling air flow rate delivered at least to the second parts 18, 20 of the preforms 12 is equal to zero, namely 0%.

Advantageously, the flap 64 is made to rotate between its positions P1 and P2 by an actuator 66 in order to position the flap 64 in a determined intermediate position somewhere between the said positions P1 and P2 and corresponding to the desired cooling air flow rate of between 100% and 0%.

For preference, the flap 64 is mounted so that it can pivot about hinge means 68.

Thus, by setting the position of each flap 64 for example associated with one of the modules M, the variation of cooling air flow rate along the associated portion of the heating path can be determined.

According to an alternative form that has not been depicted, the flap 64 is slideably mounted so that it slides between at least extreme positions P1 and P2 respectively corresponding to a cooling air flow rate of 100% and of 0%, and for preference the flap 64 is mounted with the ability to affect a translational movement in a longitudinal direction parallel to the heating zones of the heating path.

The sliding flap 64 is, for example, positioned transversely to the rear of the reflector 32 and is shaped to shut off one or more openings 34 formed in the said reflector 32 so as to allow the cooling air that is to be delivered to the second parts 18, 20 of the preforms 12 to pass at a determined flow rate dependent on the relative position of the flap 64.

For preference, each module M of the oven 10 comprises at least one duct 54 for delivering cooling air and the said at least one duct 54 (or as alternative, the reflector 32) comprises a shut-off means 64 capable of varying the air flow rate according to its position.

By comparison with the first embodiment, the shut-off means 64, such as a flap, are independent of the ventilation means 52 that create the cooling air flow rate, which means that the ventilation means 52 and/or the motors 56 can be shared, in series and/or in parallel, between at least two modules M, and so that this can be done while at the same time retaining the option of individually setting the flow rate for each of the modules M using just the one flap 64.

Specifically, assuming that the power setpoint for the motor 56 that drives the ventilation means 52 is equal to the maximum, namely to an air flow rate of 100%, the cooling air flow rate ultimately delivered to the second parts 18, 20 of the preforms 12 is then determined merely by the position of the shut-off means 64.

The variation in cooling air flow rate along the heating path is thus obtained by selectively setting the various positions of the shut-off means 64 as a whole, each advantageously being associated with one module M of the oven 10.

Of course, the flap is just one non-limiting example of the type of shut-off means 64 that can be employed for varying the flow rate along the heating path and as an alternative use could even be made of a valve gate or some other similar means.

The shut-off means 64 of the second cooling device 42 are thus capable of being set initially each to a determined position by virtue of the actuator 66 so as thereafter in operation to achieve the desired variation in air flow rate along the heating path.

Advantageously, an operating unit 70 of the second device 42 is capable of controlling the said means 64 in order selectively to vary the cooling air flow rate on the second parts 18, 20 of the preforms 12 according at least to a signal representative of the temperature, so as to set the heat treatment of the preforms 12 along the heating path through real-time control of the position of the said means 64.

For preference, the said at least one signal is representative of the internal and/or external wall temperature, advantageously of the temperature gradient between the external and internal surfaces of the wall of the body 18 and of the bottom 20 that form the second part.

Of course, the first and second embodiments just described are merely non-limiting examples of how the teachings of the invention can be implemented.

The invention further relates to a method for operating a cooling device 42 which, being fitted to a heat treatment oven 10, is intended to air-cool at least the second parts 18, 20 of the preforms 12 travelling through the oven 10 along a heating path.

The operating method comprises at least one step that involves operating means 58, 64 in order selectively to vary the cooling air flow rate delivered at least to the said second parts 18, 20 of the preforms 12 along the heating path.

In the first embodiment, the operating step therefore consists in individually setting each variator 58 in order to determine the cooling air flow rate that will be produced by the associated ventilation means 52, driven by a motor 56, so as advantageously to vary the said air flow rate along the heating path in a sequence determined by the setting of each variator 58.

Specifically, by selectively setting the setpoint for each variator 58, the cooling air flow rate that will be delivered to the second parts 18, 20 of the preforms when the said preforms 12 are travelling along the corresponding portion of the heating path is determined.

Likewise in the second embodiment, the operating step consists in individually operating each shut-off means 64, such as a flap or a valve gate, to set the cooling air flow rate desired for the corresponding portion of the heating path and thus, by selectively setting each means 64, varying the said cooling air flow rate along the heating path in a sequence determined by the setting of each actuator 66 of the shut-off means 64.

Advantageously, the operating method comprises at least one setting step consisting in real-time control of the said means 58, 60, 66, 70 in order, as a function of at least one data item, to set the air flow rate for cooling at least the second parts 18, 20 of the preforms 12, which varies along the heating path.

For preference, the said at least one data item used for operation consists of at least one signal representative of the internal and/or external temperature of the wall or of the gradient corresponding to the difference between the said internal and external temperatures.

Advantageously, the method comprises a measurement step consisting in measuring the internal and/or external temperature of the wall of each preform 12. For preference, a measurement is taken at multiple points, notably in the vertical direction along the height of the body 18 as far as the bottom 20 of the preform 12, and this is done using temperature measurement means of the type described hereinabove, such as a pyrometer, a thermal camera or probes.

Advantageously, the steps in the operating method are integrated into the more general method for heat treating the preforms 12 in such an oven 10.

Advantageously, a step of setting the heating means 30 in order selectively to vary the heating power over at least part of the heating path is also implemented.

The step of setting the heating means 30 consists in determining the heating power delivered to the second parts 18, 20 of the preforms 12 over a given portion of the heating path through the oven 10, particularly the variation in power is obtained by selectively setting the strength of the current passing through each heating means 30 and preferably for each module M.

Thus, the heating power can vary in the direction of the axis O of the preform 12, in this instance vertically, in order to establish a determined heating profile, and the heating power also varies along the heating path, notably between the first and second heating zones.

However, the heating power delivered may further vary from one module M to another along the heating path, namely in the longitudinal direction, particularly in order to establish a stabilization zone or stabilization zones in which the heating means 30 are not active.

Advantageously, the ventilation means 52 are able selectively to deliver a determined cooling air flow rate in such a stabilization zone which forms one of the portions of the heating path.

As an alternative, the ventilation means 52 are inactive in such a stabilization zone in which the air then circulates only naturally by convection.

For preference, the setting of the heating power is determined in combination with the variations in cooling air flow rate along the path according to the invention in order to optimize the heat treatment method.

Advantageously, an exposure time for exposure to the radiation of the heating means 30 is determined by setting the power and the speeds of travel of the preforms 12 along the heating path and in rotation on themselves.

The method for the heat treatment of preforms 12 in the oven 10 comprises at least one step of operating the air-cooling device of the system according to the invention so as to vary the cooling air flow rate delivered along the heating path, which operating step is advantageously performed in combination with at least one of the following setting steps which consist in:

setting the power of the heating means 30 so as to vary, along the heating path, the heating power delivered to the second parts 18, 20 of the preforms 12, particularly so as to establish stabilization zones.

Advantageously, real-time setting, as a function of at least one signal representative of the temperature, of the setting of the parameters concerned with the power delivered by the heating means 30 is also carried out.

The invention claimed is:

1. A method for operating a cooling device (42) in a heat treatment oven (10) for heat treatment of thermoplastic preforms (12) each comprising a first part (14, 16) having a definitive shape and a second part (18, 20) having a wall with internal and external surfaces, the oven including:
- a heating path through the oven that is followed by the preforms (12), the heating path including infrared radiation (IR) lamps along at least part of the heating path, the infrared radiation (IR) lamps heating the second part (18, 20) of the preforms,
- a first lengthwise portion of the heating path being located at an inlet portion of the heating path, a second lengthwise portion of the heating path being connected to the first portion, a third lengthwise portion of the heating path being connected to the second portion, and a final lengthwise portion of the heating path being located at an outlet portion of the heating path, and
- a cooling system (36) comprised of a first cooling device (40) that air-cools the first part (14, 16) of the preforms and a second cooling device (42) that air-cools the second part (18, 20) of the preforms,
- said second cooling device (42) comprising plural fans (52), each fan driven by a respective motor, each fan operative to deliver a flow rate of cooling air to a respective separate one of the lengthwise portions of the heating path, and flow rate varying means (58, 64) for selectively and separately setting the flow rate of cooling air delivered by each of said plural fans to the second part of the preforms in the respective separate lengthwise portions of the heating path, said flow rate varying means comprising a respective independently operable speed variator (58) associated with each of said plural fans, the method comprising:
- before the preforms travel along the heating path,
- determining the respective cooling air flow rates to be delivered to said second parts (18, 20) of the preforms (12) in each of the respective separate lengthwise portions of the heating path, at least on a basis of a temperature gradient to be reached through a thickness of the wall of said second parts as the preforms travel along the heating path, wherein the temperature gradient to be reached is such that the temperature of the internal surface of the wall is greater than or at least equal to the temperature of the external surface of the wall, and
- subsequently to the determining step, selectively and separately operating the flow rate varying means (58, 64) to selectively set the determined respective cooling air flow rates to be delivered to said second parts (18, 20) of the preforms (12) in the respective separate lengthwise portions of the heating path;
- as the preforms travel along the heating path, cooling the second parts of the preforms using the determined, selectively set, respective cooling air flow rates in the respective separate lengthwise portions of the heating path; and
- operating the first cooling device (40) that air-cools the first part (14, 16) of the preforms independently of the second cooling device (42) that air-cools the second part (18, 20) of the preforms.

2. The method according to claim 1, further comprising:
- measuring at least one of an internal temperature and an external temperature of the wall of the second part (18, 20) of the preforms (12) so as to produce a signal representative of the at least one of the internal and external temperatures or of the gradient corresponding to a difference between the internal and external temperatures.

3. The method according to claim 2, further comprising, as the preforms travel along the heating path, based on a result of said measuring step, changing the determined, selectively set, respective cooling air flow rates in the respective separate lengthwise portions of the heating path by repeating the determining and selectively setting steps based on the signal.

4. The method according to claim 1, further comprising:
- setting a power of the infrared radiation (IR) lamps (30) so as to vary, along the heating path, the heating power delivered to the second parts (18, 20) of the preforms (12).

5. The method according to claim 1, further comprising, as the preforms travel along the heating path, not changing the determined, selectively set, respective cooling air flow rates in the respective separate lengthwise portions of the heating path.

6. The method of claim 1, wherein in the determining step, the determination of the temperature gradient to be reached as the preforms travel along the heating path defined by each respective module is based on a function of a position occupied by the preform along the said heating path.

7. The method of claim 6, wherein the determining step determines that:
- the cooling air flow rate to be delivered to said second parts (18, 20) of the preforms (12) in the second lengthwise portion of the heating path is set to be greater than the cooling air flow rate to be delivered to said second parts (18, 20) of the preforms (12) in the first lengthwise portion of the heating path,
- the cooling air flow rate to be delivered to said second parts (18, 20) of the preforms (12) in third lengthwise portion of the heating path is set to be less than the cooling air flow rate to be delivered to said second parts (18, 20) of the preforms (12) in the second lengthwise portion of the heating path, and
- the cooling air flow rate to be delivered to said second parts (18, 20) of the preforms (12) in final lengthwise portion of the heating path is set to be greater than the cooling air flow rate to be delivered to said second parts (18, 20) of the preforms (12) in the second lengthwise portion of the heating path.

8. The method of claim 7, wherein the determining step determines that:
- the cooling air flow rate to be delivered to said second parts (18, 20) of the preforms (12) in the first lengthwise portion of the heating path is set to correspond to a non-zero amount less than 30% of a maximum power of the motor of the fan,
- the cooling air flow rate to be delivered to said second parts (18, 20) of the preforms (12) in second lengthwise portion of the heating path is set to correspond to a value between 30-60% of a maximum power of the motor of the fan,
- the cooling air flow rate to be delivered to said second parts (18, 20) of the preforms (12) in third lengthwise portion of the heating path is zero, and
- the cooling air flow rate to be delivered to said second parts (18, 20) of the preforms (12) in final lengthwise portion of the heating path is set to correspond to a value between 80-100% of a maximum power of the motor of the fan.

9. The method of claim 1, wherein the determining step determines that:
- the cooling air flow rate to be delivered to said second parts (18, 20) of the preforms (12) in the second lengthwise portion of the heating path is greater than the cooling air flow rate to be delivered to said second parts (18, 20) of the preforms (12) in the first lengthwise portion of the heating path, the cooling air flow rate to be delivered to said second parts (18, 20) of the preforms (12) in third lengthwise portion of the heating path is less than the cooling air flow rate to be delivered to said second parts (18, 20) of the preforms (12) in the second lengthwise portion of the heating path, and the cooling air flow rate to be delivered to said second parts (18, 20) of the preforms (12) in final lengthwise portion of the heating path is greater than the cooling air flow rate to be delivered to said second parts (18, 20) of the preforms (12) in the second lengthwise portion of the heating path.

10. The method of claim 9, wherein the determining step determines that:

the cooling air flow rate to be delivered to said second parts (18, 20) of the preforms (12) in the first lengthwise portion of the heating path corresponds to a non-zero amount less than 30% of a maximum power of the motor of the fan, the cooling air flow rate to be delivered to said second parts (18, 20) of the preforms (12) in second lengthwise portion of the heating path corresponds to a value between 30-60% of a maximum power of the motor of the fan, the cooling air flow rate to be delivered to said second parts (18, 20) of the preforms (12) in third lengthwise portion of the heating path is zero, and the cooling air flow rate to be delivered to said second parts (18, 20) of the preforms (12) in final lengthwise portion of the heating path corresponds to a value between 80-100% of a maximum power of the motor of the fan.

11. A method for operating a cooling device (42) in a heat treatment oven (10) for heat treatment of thermoplastic preforms (12) each comprising a first part (14, 16) having a definitive shape and a second part (18, 20) having a wall with internal and external surfaces, the oven including:

plural modules connected in series to define a heating path through the oven that is followed by the preforms (12) with an axis (0) of the preforms extending in a first direction, the heating path including infrared radiation (IR) lamps along at least part of the heating path, the infrared radiation (IR) lamps heating the second part (18, 20) of the preforms, a first module of the plural modules being located at an inlet portion of the heating path, a second module of the plural modules being connected to the first module, a third module of the plural modules being connected to the second module, and a final module of the plural modules being located at an outlet portion of the heating path, each of the plural modules including a cooling system (36) comprised of a first cooling device (40) that air-cools the first part (14, 16) of the preforms and a second cooling device (42) that air-cools the second part (18, 20) of the preforms, each first cooling device (40) comprising a first fan (52) located at an inlet side of a first duct (46) that operates to deliver a first cooling air stream (A) through the first duct (46) to a discharge of the first duct (46) located along a first lengthwise portion of the heating path to discharge the first cooling air stream (A) toward the first part (14, 16) of the preforms in a second direction that crosses the first direction of the axis (0) of the preforms to air-cool the first part (14, 16) of the preforms, each second cooling device a second fan (52) driven by a motor and located within a second duct (54) that operates to deliver a second cooling air stream (B) through the second duct (54) to a discharge of the second duct (54) located along a second lengthwise portion of the heating path, wherein the discharge of the second duct (54) comprises openings (34) through which the second cooling air passes to deliver the second cooling air in a third direction that crosses the first direction of the axis (O) of the preforms to air-cool the second part (18, 20) of the preforms, each of the plural modules cooling a different, separate lengthwise portion of the heating path, the first module cooling a first lengthwise portion of the heating path located the inlet portion of the heating path, the second module cooling a second lengthwise portion of the heating path located downstream the first lengthwise portion of the heating path, the third module cooling a third lengthwise portion of the heating path located downstream the second module, and a final module cooling a final lengthwise portion of the heating path located at the outlet portion of the heating path, each second cooling device further comprising a flow rate varying means (58, 64) for selectively setting a flow rate of cooling air of the second cooling air stream (B) in the second duct (54), the flow rate of the cooling air of the second cooling air stream (B) in each respective module is set independently of the flow rate of the cooling air of the second cooling air stream (B) the other modules, each said flow rate varying means comprising a respective independently operable speed variator (58) associated with each of said second fans (52), the method comprising:

determining a respective cooling air flow rate of the second cooling air stream (B) in the second duct (54) in each of the plural modules defining the heating path, wherein the determination of the respective cooling air flow rates of the second cooling air stream (B) to be delivered to said second parts (18, 20) of the preforms (12) in each of the respective separate lengthwise portions of each of the modules defining the heating path is at least on a basis of a temperature gradient to be reached through a thickness of the wall of said second parts as the preforms travel along the heating path defined by each respective module, wherein the temperature gradient to be reached is such that the temperature of the internal surface of the wall is greater than or at least equal to the temperature of the external surface of the wall, subsequent to said determining step, selectively setting and separately operating the flow rate varying means (58, 64) to selectively set the determined respective cooling air flow rates to be delivered to said second parts (18, 20) of the preforms (12) in the respective separate lengthwise portions of the heating path defined by each respective module including operating the speed variator (58) associated with the second fan (52) of each of the plural modules to deliver the determined respective flow rate of the second cooling air stream (B) in the second duct (54) in each of the plural modules;

as the preforms travel along the heating path defined by each of the modules, cooling the second parts of the preforms using the determined, selectively set, respective cooling air flow rates in the respective separate lengthwise portions of each of the module defining the heating path; and operating the first cooling device (40) that air-cools the first part (14, 16) of the preforms independently of the second cooling device (42) that air-cools the second part (18, 20) of the preforms.

12. The method of claim 11, wherein, based on the determining step, the cooling air flow rate of the second cooling air stream (B) to be delivered to said second parts (18, 20) of the preforms (12) in second module is set and operated to be greater than the cooling air flow rate of the second cooling air stream (B) to be delivered to said second parts (18, 20) of the preforms (12) in the first module, the cooling air flow rate of the second cooling air stream (B) to be delivered to said second parts (18, 20) of the preforms (12) in third module is set and operated to be greater than the cooling air flow rate of the second cooling air stream (B) to be delivered to said second parts (18, 20) of the preforms (12) in the second module, and the cooling air flow rate of the second cooling air stream (B) to be delivered to said second parts (18, 20) of the preforms (12) in final module is set and operated to be less than the cooling air flow rate of the second cooling air stream (B) to be delivered to said second parts (18, 20) of the preforms (12) in the second module, the cooling air flow rate to be delivered to said second parts (18, 20) of the preforms (12) in final module of the heating path is set and operated to be greater than the cooling air flow rate to be delivered to said second parts (18, 20) of the preforms (12) in the second lengthwise portion of the heating path.

13. The method of claim 12, wherein the determining step determines that:

the cooling air flow rate to be delivered to said second parts (18, 20) of the preforms (12) in the first module of the heating path is set to correspond to a non-zero amount less than 30% of a maximum power of the motor of the fan, the cooling air flow rate to be delivered to said second parts (18, 20) of the preforms (12) in second module of the heating path is set to correspond to a value between 30-60% of a maximum power of the motor of the fan, the cooling air flow rate to be delivered to said second parts (18, 20) of the preforms (12) in third module of the heating path is zero, and the cooling air flow rate to be delivered to said second parts (18, 20) of the preforms (12) in final module of the heating path is set to correspond to a value between 80-100% of a maximum power of the motor of the fan.

14. A method for operating a cooling device (42) in a heat treatment oven (10) for heat treatment of thermoplastic preforms (12) each comprising a first part (14, 16) having a definitive shape and a second part (18, 20) having a wall with internal and external surfaces, the oven including:

a heating path through the oven that is followed by the preforms (12), the heating path including infrared radiation (IR) lamps along at least part of the heating path, the infrared radiation (IR) lamps heating the second part (18, 20) of the preforms, a first lengthwise portion of the heating path being located at an inlet portion of the heating path, a second lengthwise portion of the heating path being connected to the first portion, a third lengthwise portion of the heating path being connected to the second portion, and a final lengthwise portion of the heating path being located at an outlet portion of the heating path, and a cooling system (36) comprised of a first cooling device (40) that air-cools the first part (14, 16) of the preforms and a second cooling device (42) that air-cools the second part (18, 20) of the preforms, said second cooling device (42) comprising plural fans (52), each fan driven by a respective motor, each fan operative to deliver a flow rate of cooling air to a respective separate one of the lengthwise portions of the heating path, and flow rate varying means (58, 64) for selectively and separately setting the flow rate of cooling air delivered by each of said plural fans to the second part of the preforms in the respective separate lengthwise portions of the heating path, said flow rate varying means comprising a respective independently operable speed variator (58) associated with each of said plural fans, the method comprising:

determining the respective cooling air flow rates to be delivered to said second parts (18, 20) of the preforms (12) in each of the respective separate lengthwise portions of the heating path, at least on a basis of a temperature gradient to be reached through a thickness of the wall of said second parts as the preforms travel along the heating path, wherein the temperature gradient to be reached is such that the temperature of the internal surface of the wall is greater than or at least equal to the temperature of the external surface of the wall, and subsequently to the determining step, selectively and separately operating the flow rate varying means (58, 64) to selectively set the determined respective cooling air flow rates to be delivered to said second parts (18, 20) of the preforms (12) in the respective separate lengthwise portions of the heating path;

as the preforms travel along the heating path, cooling the second parts of the preforms using the determined, selectively set, respective cooling air flow rates in the respective separate lengthwise portions of the heating path; and operating the first cooling device (40) that air-cools the first part (14, 16) of the preforms independently of the second cooling device (42) that air-cools the second part (18, 20) of the preforms.

* * * * *